(No Model.)
A. MONTANT.
VISE.
No. 343,187. Patented June 8, 1886.
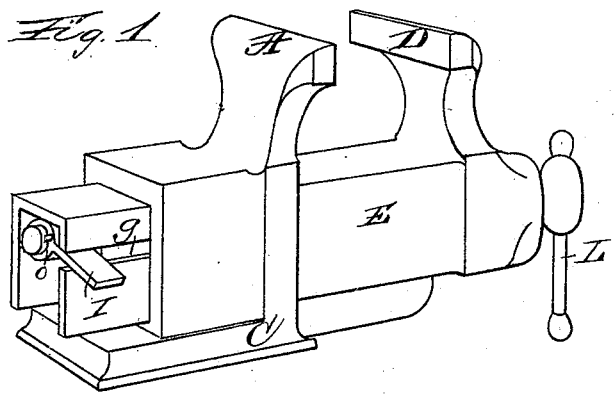
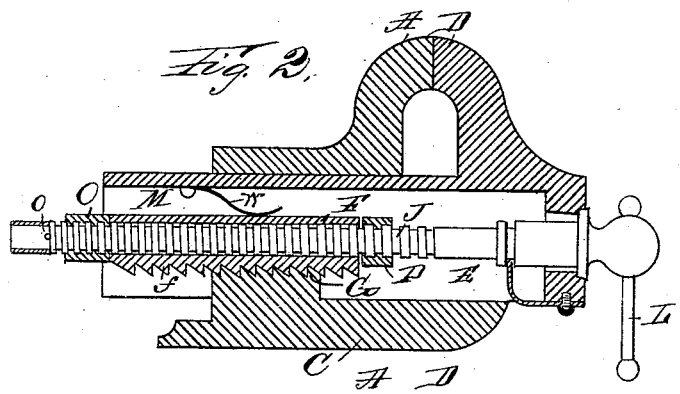
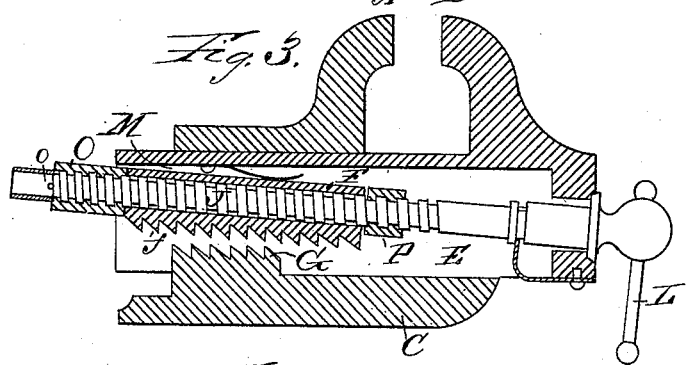
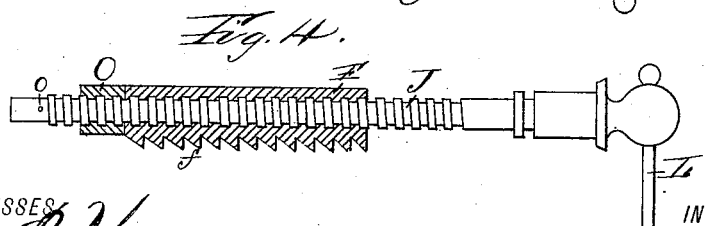
WITNESSES
Jas. C. Warner
Frank A. Baird
INVENTOR
Alphonse Montant
by his Atty.
W. L. Bennem

UNITED STATES PATENT OFFICE.

ALPHONSE MONTANT, OF NEW YORK, N. Y.

VISE.

SPECIFICATION forming part of Letters Patent No. 343,187, dated June 8, 1886.

Application filed December 3, 1885. Serial No. 184,573. (No model.)

*To all whom it may concern:*

Be it known that I, ALPHONSE MONTANT, a citizen of the United States, of the city, county, and State of New York, have invented certain new and useful Improvements in Vises, of which the following is a specification.

My invention relates to improvements in vises of the description shown and described in the application for Letters Patent of the United States filed by me on or about the 4th day of February, 1885, Serial No. 154,930; and the object of my present invention is the simplification of the parts of the said device coupled with equal or greater power.

The accompanying drawings form part of this specification and illustrate what I consider the best means of carrying out my invention.

Figure 1 is a perspective view of a vise with my improvements applied thereto. Fig. 2 is a central vertical section of Fig. 1, showing the parts in a closed position. Fig. 3 is a similar view with the jaws apart. Fig. 4 shows a slight modification.

In each of the views similar letters of reference are employed to indicate corresponding parts wherever they occur.

In the drawings I have represented an ordinary vise having a fixed jaw, A, and a movable jaw, D, the usual nut being replaced by serrations G, attached to the frame C of the fixed jaw A, into which are received teeth or serrations $f$ of a sleeve, F, through which the screw J passes. This sleeve F fits snugly into the movable jaw D, with sufficient play between the top of the said sleeve F and the roof of the hollow extension M of the movable jaw A to admit of the said sleeve being raised so as to free its teeth $f$ from the teeth G of the frame C, as hereinafter described.

W is a spring, which serves to aid in forcing the sleeve F down into position.

In the rear of the sleeve F, and threaded to the screw J, is a nut, O, upon which nut O is formed or affixed a pin or extension, I, which is adapted to pass through and work in a slot, $g$, formed in the side of the hollow extension M of the movable jaw A at its end farthest from the handle L.

In the rear of the nut O a pin, $o$, is passed through the end of the screw J. According to the arrangement shown, when the screw J is turned by the handle L to the left, the pin $o$ in the end of the screw J comes in contact with nut O and forces the said nut O to make a partial revolution, whereby the pin I, carried by the nut O, which rests on the lower edge of the slot $g$, acts as a lever to raise the screw J, and consequently the teeth of the sleeve F from the teeth G of the fixed jaw A. The movable jaw D is now free to be pushed in or drawn out, as desired.

When an object has been placed between the jaws A, the movable jaw D is pressed against such object. The handle is then turned to the right, the sleeve F and the screw J fall, and the teeth $f$ engage with the teeth G, and any further turning of the screw J by the handle L causes an increase of pressure on the object held between the jaws A and D. The nut O can be unthreaded, when a pin would be introduced through the screw slightly in advance of the sleeve, to prevent the nut from jamming against said sleeve. I can also make the hole through the sleeve F sufficiently large to allow of the said sleeve sliding freely over the threads of the screw J, the nut alone being used as the screwing device, in which case the nut O and sleeve F can be made of any desired length or shape.

In place of the pin I, I can employ a cam or other extension to which axial motion can be imparted by the screw J and handle L, to cause the separation of the serrations $f$ and G.

The hollow slide E forms part of the movable jaw D.

Referring to Figs. 1, 2, and 3, P is a nut arranged in front of the sleeve F and threaded on the screw J, fitting snugly to the side of the jaw, for the purpose of keeping the sleeve correctly in position. A spiral spring would answer the same purpose.

In Fig. 4 I have shown the sleeve threaded on the screw F for the whole of its length; but this may be varied, as in some cases I can employ a thread extending only partially along the sleeve from either or both ends.

Having thus described my invention, what I claim, and desire to secure by Letters Patent, is—

1. In a vise having a fixed and movable jaw, the combination, with the screw J and handle L, and the serrated sleeve F and serrations G, of the nut O and extension I, and pin o, substantially as and for the purpose described.

2. In a vise having a fixed and movable jaw, the combination, with the hollow slide E and slot g, of the screw J, handle L, and the serrated sleeve F, serrations G, the nut O, and extension I, and pin o, substantially as shown and described.

3. In a vise having a fixed and a movable jaw, the combination, with the hollow slide E, slot g, and spring W, of the screw J, handle L, serrated sleeve and serrations G, the nut O, and extension I, and pin o, substantially as shown and described.

4. In a vise having a fixed and a movable jaw, the combination, with the hollow slide E and slot g, of the screw J, handle L, serrated sleeve and serrations G, the nut O, and extension I, and the nut P, substantially as and for the purpose described.

In witness whereof I have hereunto set my hand this 1st day of December, 1885.

ALPHONSE MONTANT.

Witnesses:
W. L. BENNEM,
JAS. E. WARNER.